United States Patent Office 2,693,465
Patented Nov. 2, 1954

2,693,465

PROCESS OF MANUFACTURE OF 6,7-DIHYDRO-5H-DIBENZ[c,e]AZEPINE AND DERIVATIVES

Robert August Schmidt, Wallington, and Wilhelm Wenner, Upper Montclair, N. J., assignors to Hoffmann-La Roche Inc., Nutley, N. J., a corporation of New Jersey No Drawing. Application April 20, 1953,
Serial No. 349,968

2 Claims. (Cl. 260—239)

In Wenner U. S. Patent No. 2,619,484, there are disclosed novel tricyclic amines, e. g., 6,7,-dihydro-5H-dibenz[c,e]azephine and derivatives thereof, useful in therapeutics to inhibit or reverse the physiological actions of epinephrine. In that disclosure, the said tricyclic amines are made by reacting o,o'-bis-(bromomethyl)-biphenyl with ammonia or with a primary amine. The instant invention relates to an alternative process for making the same compounds, and broadly can be described as comprising the steps of reducing diphenimide to form 6,7-dihydro-5H-dibenz[c,e]azepine, and if desired, reacting the latter with a lower alkyl halide or a lower alkenyl halide to introduce an aliphatic substituent at the 6-position. A specific embodiment of the invention comprises dehydrating diphenic acid to form diphenic anhydride, aminating the latter to produce diphenamic acid, removing one mol of ammonia therefrom to yield diphenimide, treating the latter with lithium aluminum hydride to yield 6,7-dihydro-5H-dibenz[c,e]azepine and reacting the latter with an allyl halide to form a hydrohalic acid addition salt of 6-allyl-6,7-dihydro-5H-dibenz[c,e]azepine.

The invention is further disclosed in the following example, which is illustrative but not limitative thereof.

*Example*

29 grams of diphenic acid were stirred in 900 cc. of acetic anhydride at 120° C. for one hour. The cooled mixture was filtered and washed with acetic acid to give diphenic anhydride, colorless crystals, M. P. about 222°–226° C.

24.11 grams of diphenic anhydride were mixed with 50 cc. of concentrated ammonia. The mixture warmed up and cooling was applied, after which the mixture was stirred till a clear solution formed and for 1½ hours afterward. The mixture was acidified and allowed to stand overnight. Water was added, initiating precipitation. The mixture was chilled and filtered to yield diphenamic acid, a colorless solid, M. P. about 191°–193° C.

23.5 grams of diphenamic acid were heated at 200° C. in an oil bath, first for about 20 hours at atmospheric pressure and then for about 10 hours at about 20 mm. Melting points were taken at intervals in order to gain an idea of the extent of reaction. The final residue was boiled with alcohol but since the solid exhibited insufficient solubility in the hot solvent, the mixture was filtered. The residue consisted of tan crystals, M. P. about 220°–221° C., and the filtrate on cooling gave an additional crop of tan crystals, M. P. about 219°–221° C. The two materials were identical and consisted of diphenimide.

5.58 grams of diphenimide were placed in a Soxhlet thimble and extracted for about 3 days with a boiling mixture of 9.0 g. of lithium aluminum hydride in 600 cc. of sodium-dried ether. Excess lithium aluminum hydride was then decomposed cautiously with water and the mixture was filtered through a filter aid by suction. The filtrate consisted of two layers. The ether layer was separated and dried with anhydrous potassium carbonate and acidified with alcoholic hydrochloric acid to give 6,7-dihydro-5H-dibenz[c,e]azepine hydrochloride, M. P. about 287°–289° C.

One gram of 6,7-dihydro-5H-dibenz[c,e]azepine hydrochloride was dissolved in water, made alkaline with concentrated ammonia, and the resultant base extracted twice with benzene. The benzene layers were combined, dried with anhydrous potassium carbonate, and mixed with 0.261 g. of allyl bromide at 25°–30° C. The reaction solution became turbid within a few minutes and showed a considerable crystalline deposit after standing 3½ days. The mixture was warmed 1¾ hours on the steam bath in a loosely-stoppered flask, then cooled and filtered. The filtrate was washed twice with water and the benzene layer evaporated at diminished pressure. The liquid residue was dissolved in alcohol, shaken with charcoal and filtered. Addition to the filtrate of 0.3 gram of 85 per cent phosphoric acid in alcohol gave a clear solution which, when seeded and rubbed, yielded 6-allyl-6,7-dihydro-5H-dibenz[c,e]azepine phosphate, M. P. about 211°–215° C. with decomposition.

We claim:
1. A process which comprises reacting diphenimide with lithium aluminum hydride and treating the reduction product with a reagent selected from the class consisting of lower alkyl halides and lower alkenyl halides.

2. A process of making 6,7-dihydro-5H-dibenz[c,e]azepine which comprises reducing diphenimide with lithium aluminum hydride.

References Cited in the file of this patent

UNITED STATES PATENTS

| Number | Name | Date |
|---|---|---|
| 2,520,264 | Walter | Aug. 29, 1950 |
| 2,619,484 | Wenner | Nov. 25, 1952 |

OTHER REFERENCES

Morrison et al., J. Chem. Soc., vol. 1951, pp. 952–5.